United States Patent [19]
Hurst

[11] 3,712,453
[45] Jan. 23, 1973

[54] APPARATUS FOR TRANSFERRING ARTICLES

[75] Inventor: Robert L. Hurst, Muncie, Ind.

[73] Assignee: Ball Corp., Muncie, Ind.

[22] Filed: Dec. 18, 1970

[21] Appl. No.: 99,405

Related U.S. Application Data

[62] Division of Ser. No. 784,845, Dec. 18, 1968, Pat. No. 3,641,959.

[52] U.S. Cl. ................................................ 198/41
[51] Int. Cl. ............................................. B65g 17/46
[58] Field of Search ............. 198/32, 33 AD, 41, 76; 271/63 A

[56] References Cited

UNITED STATES PATENTS

| | | | |
|---|---|---|---|
| 1,139,070 | 5/1915 | Phelps | 198/41 X |
| 3,338,374 | 8/1967 | Dudley | 198/41 |
| 3,523,601 | 8/1970 | Mojden | 198/41 |

FOREIGN PATENTS OR APPLICATIONS

| | | | |
|---|---|---|---|
| 876,698 | 9/1961 | Great Britain | 198/41 |

*Primary Examiner*—Edward A. Sroka
*Attorney*—Campbell, Harris & O'Rourke

[57] ABSTRACT

Completely automatic system is disclosed for handling articles such as metal discs for closures of the two-piece type which are stamped and formed and then fed sealing face down to a conveyor belt. At first transfer zone, magnet pulls each disc or lid up against lower pass of second conveyor belt. Magnetic pulley retains lids in contact with belt to swing up through arc to upper pass of belt. Lids are then conveyed to treating zone where gasket material is applied as lids are rotated and transported arcuately. Radial arms on carousel travel in circle to pick up lids sequentially by magnetism or vacuum from coating table and transfer them to upper pass of next conveyor. At next transfer zone, lids are picked up sequentially by individual magnets on lower pass of next conveyor and moved to next transfer zone where they are released in groups to form transverse rows on wide conveyor belt. Belt passes through curing station and diverter realigns transverse rows to fore and aft single file. Next conveyor transfers and feeds lids sequentially to assembly zone. Closure bands are also fed sequentially to assembly zone and combined with lids to produce assembled two-piece closures. Lids may alternatively be fed to different assembly zone where they are packed in sets for shipping. One-piece closures with integral lid and flange may be formed and processed in same manner.

7 Claims, 28 Drawing Figures

INVENTOR.
Robert L. Hurst
BY
Campbell, Harris & O'Rourke
ATTORNEYS

PATENTED JAN 23 1973 3,712,453

INVENTOR.
Robert L. Hurst
BY
Campbell, Harris & O'Rourke
ATTORNEYS

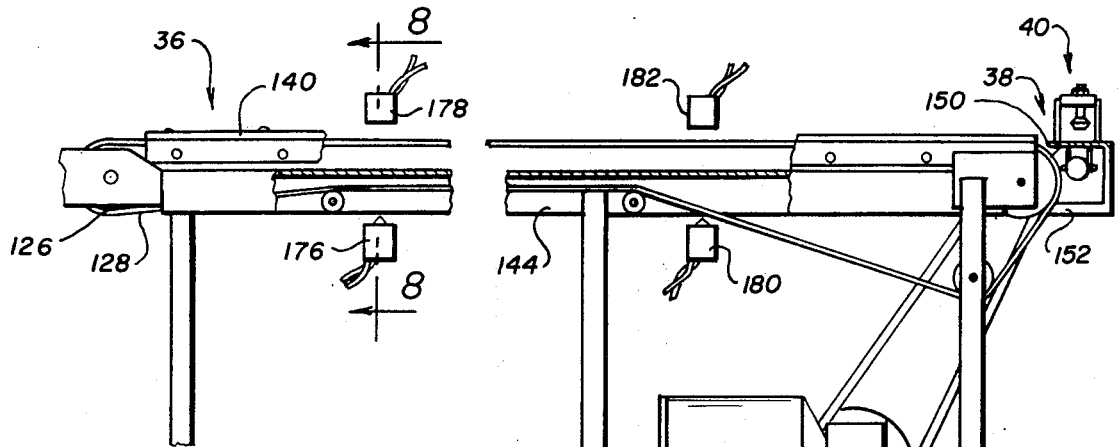
FIG. 7
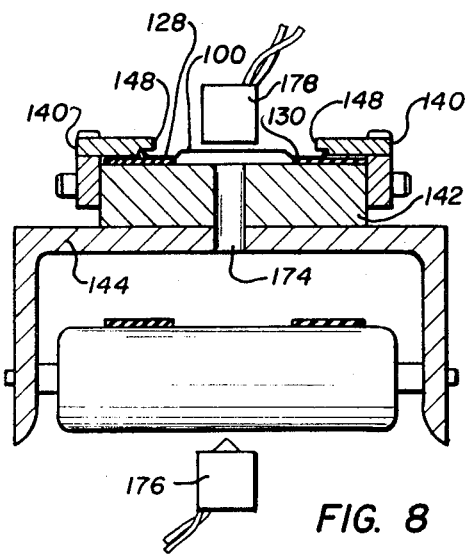
FIG. 8
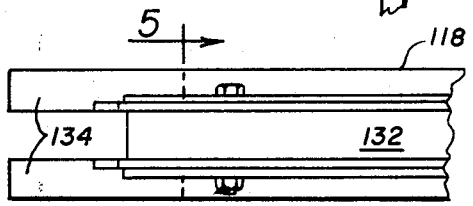
FIG. 4
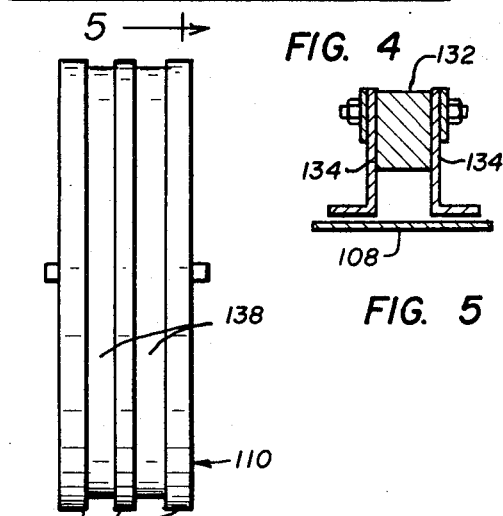
FIG. 5
FIG. 6
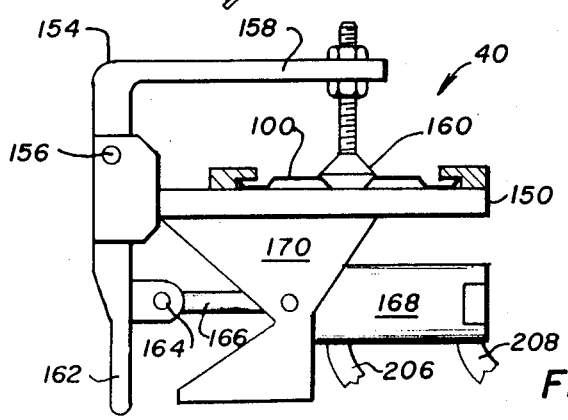
FIG. 9
INVENTOR.
Robert L. Hurst
BY
Campbell, Harris & O'Rourke
ATTORNEYS

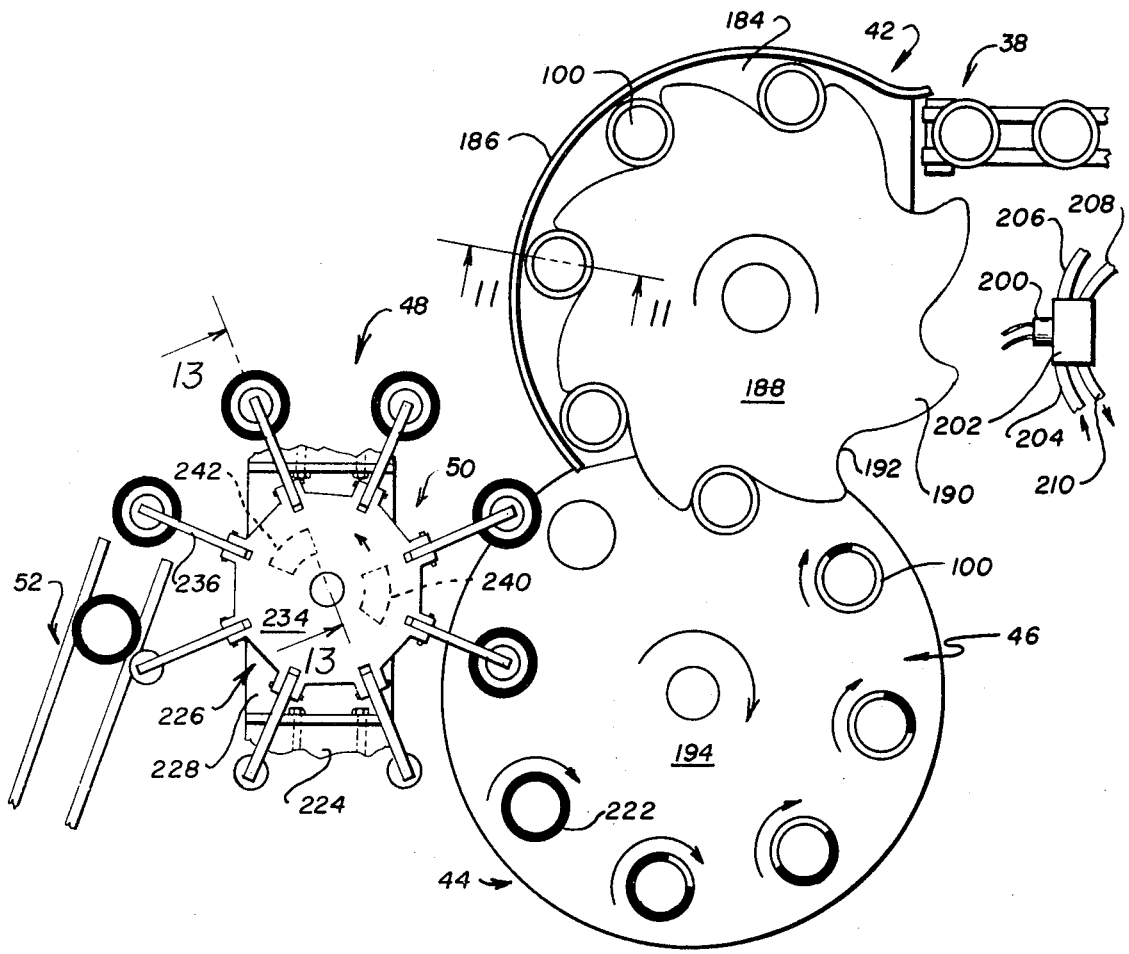
FIG. 10
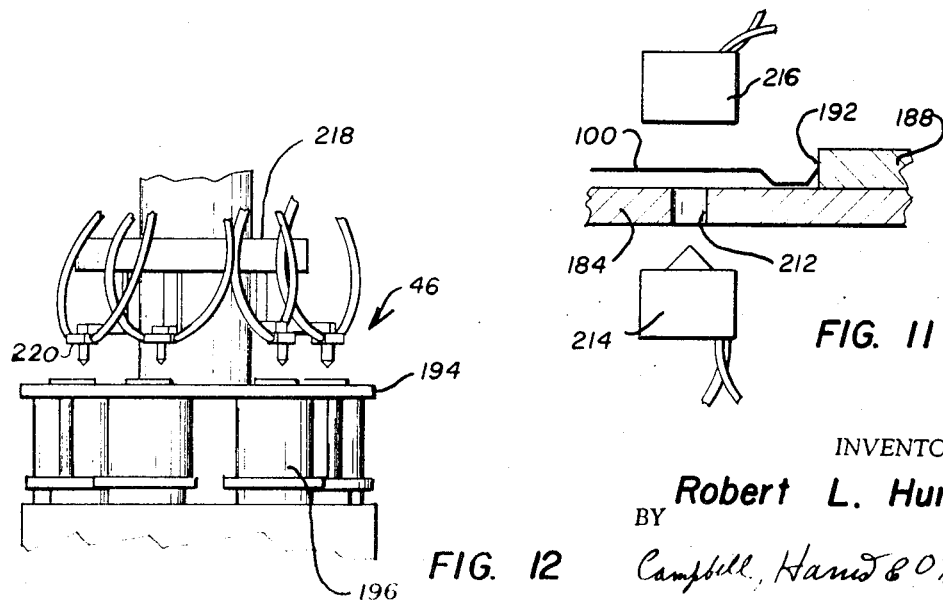
FIG. 11
FIG. 12
INVENTOR.
Robert L. Hurst
BY Campbell, Harris & O'Rourke
ATTORNEYS INVENTOR.
Robert L. Hurst
BY Campbell, Hand & O'Rourke
ATTORNEYS

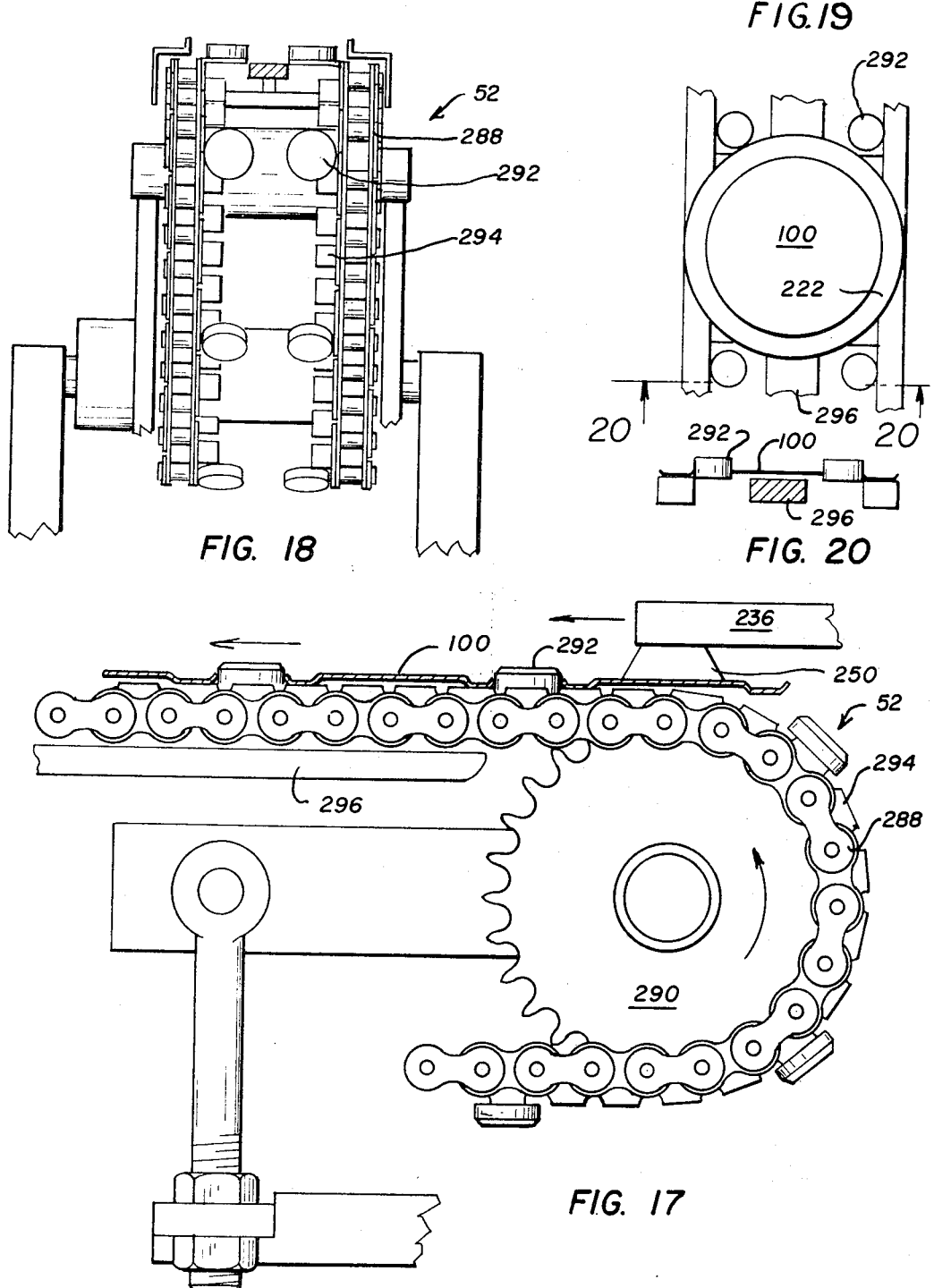

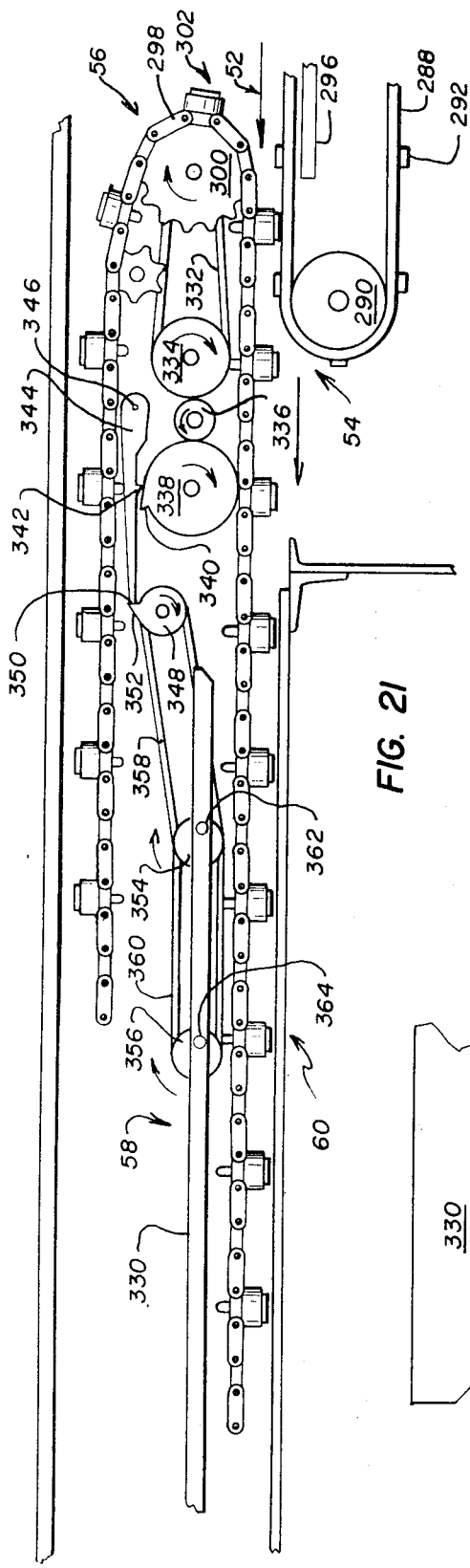
FIG. 21
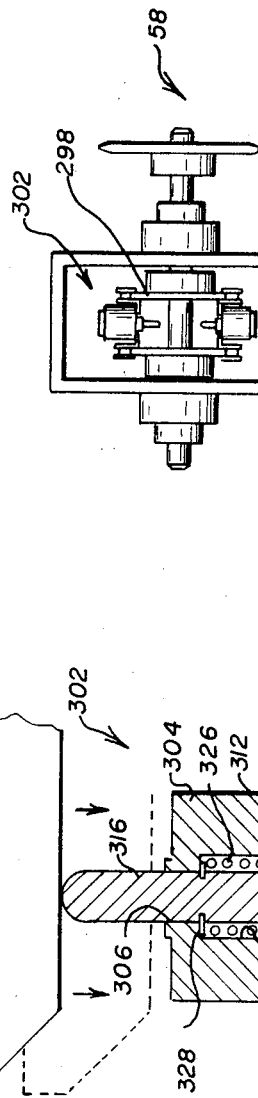
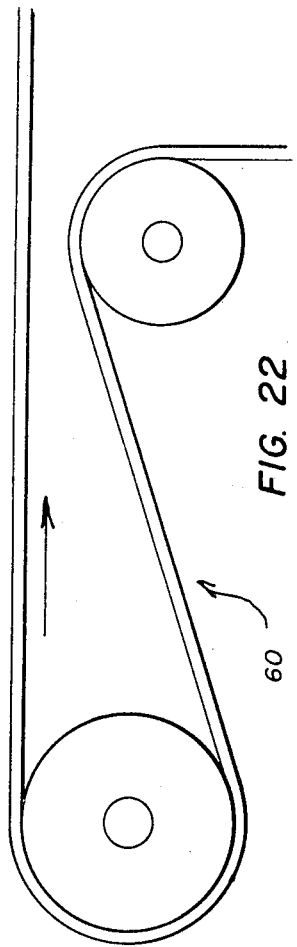
FIG. 22
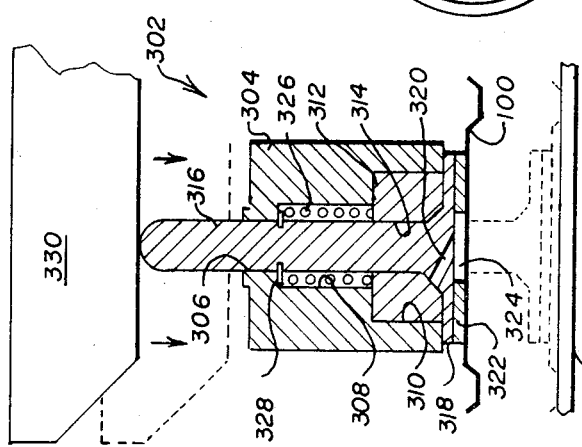
FIG. 23
INVENTOR.
Robert L. Hurst
BY
Campbell, Harris & O'Rourke
ATTORNEYS INVENTOR.
Robert L. Hurst
BY
Campbell, Harris & O'Rourke
ATTORNEYS INVENTOR.
Robert L. Hurst
BY
Campbell, Hand & O'Rourke
ATTORNEYS

APPARATUS FOR TRANSFERRING ARTICLES

CROSS REFERENCE TO RELATED APPLICATION

This application is a Division of my copending application Serial Number 784,845, filed December 18, 1968 and entitled "Method and Apparatus for Producing Closures" now U.S. Pat. No. 3,641,959.

BACKGROUND OF THE INVENTION

Glass jars have been used for many years for the purpose of home canning of fruits and vegetables, and many types of closures have been evolved for sealing such jars. Of the many early types, Putman's "Lightning Jar", which utilized a glass cover plate, the margin of which pressed an annular rubber gasket against the margin of the jar mouth with the cover plate held tight by a toggle operated bail, and Mason's screw threaded jar fitted with a zinc cap having mating threads on the flange to hold rubber gasket material against the jar to form a top seal, were particularly popular.

Subsequently, two-piece closures were developed comprising a disc type lid having a concave margin to seat on the margin of the jar mouth, the concave margin being coated with a gasket material formed in place such as cured latex and, more recently, plastisol, the lid being clamped in place by a flanged and threaded band which engaged corresponding threads on the jar mouth and the periphery of the lid. The two-piece closure has come into widespread use because the bands may be used repeatedly so that only the lids need be replaced for each new use.

Prior practice in the manufacture of the lids has been rather inefficient and relatively costly because of a large amount of manual handling, which also results in lower production than might otherwise be realized for effort expended. The lids are very thin and may be easily deformed. Moreover, they are commonly treated on the sealing face to prevent corrosion by the contents of a jar and it is essential to avoid scratching the protective coating which would render them unusable. It has been common after each operation to place, or stack, the lids in a storage bin. They then have to be sorted out and fed uniformly into the next operating stage. When gasket material to be formed in place is applied to the concave marginal seat, it is in viscous form but still quite subject to running or spreading if the lid is tilted or jarred laterally while it is traveling to a curing station. A large proportion of two-piece closures have been assembled by hand, and this, too, has proved to be cumbersome as well as expensive.

SUMMARY OF THE INVENTION

The present invention overcomes the difficulties mentioned above and provides a system for handling articles which eliminates all manual operations from initial stamping to final assembly. The articles are accurately controlled at every stage to prevent damage of any kind and to prevent any displacement of the gasket material, as a result, production rates have been increased substantially, while at the same time greatly enhancing uniformity and quality of product.

Generally stated, the system includes a machine to stamp out disc-shaped lids and form a concave peripheral sealing seat on a first face of each lid. The machine sequentially supplies the lids to the adjacent end of a conveyor of the endless loop belt type with the first or sealing face down, and the conveyor delivers the lids sequentially to a first transfer zone. At this transfer zone, a second belt conveyor is arranged to overlie the end of the first conveyor and extends horizontally in a direction perpendicular to the longitudinal axis of the first conveyor.

The lower pass of the second conveyor is slightly spaced above the upper pass of the first conveyor and a magnet, preferably of the ceramic encapsulated type, closely overlies the lower pass of the second conveyor at the juncture. The magnetic field created by the magnet is sufficient to pull each lid up as it reaches the juncture and hold it against the second conveyor belt, as the latter moves the lid away from the juncture. The pulley which guides the second conveyor belt into a return course is provided with magnets which hold the lids in contact with the belt as they move upward in an arc of about 180 degrees so that the lids become inverted with their first or sealing faces up to receive the sealing material.

The upper pass of the second conveyor moves the lids onward and passes them on to a third conveyor which delivers them sequentially to a first treating zone where they are fed onto a coating table at selected intervals along its periphery. As the lids travel through a horizontal arc, a series of pouring spouts apply a coating of sealing material, which may be latex, but preferably a selected plastisol, to the margin of each lid in the concave seat.

A carousel is located adjacent to the coating table and includes a standard mounted for rotation about a vertical axis and a plurality of radial arms. Each arm has a pickup device, which may be magnetic or vacuum, at its outer end to pick up a lid from a station of the coating table. The carousel is so located and operated at such a rate that the pickup devices pass over a selected point on the peripheral path of travel of the coating stations at the same time as one of the coating stations reaches that point, and each pickup device picks up one lid and swings it through an arc to deposit it on the upper pass of the adjacent end of the fourth belt type conveyor.

This conveyor moves the lids sequentially to the next transfer zone where a fifth conveyor is arranged in longitudinal alignment with the fourth and its receiving end overlaps and overlies the delivery end of the fourth so that its lower pass is spaced vertically above the upper pass of the fourth. This lower pass travels in the same direction as the upper pass of the fourth and is provided with discrete individual magnets, each of which picks up a single lid from the fourth conveyor and carriers it onward to the next transfer zone.

At this latter transfer zone a sixth conveyor belt is arranged with its horizontal path of travel perpendicular to that of the fifth conveyor, and it extends from this transfer zone to and through a second treating zone or curing station. The sixth belt is wide enough to accommodate a plurality of lids in a row transverse to the direction of of travel of the belt, and the row may constitute as many as twenty lids. As the fifth conveyor delivers lids to the transfer zone, its magnets are caused to release a plurality of lids simultaneously to deposit them in transverse rows on the sixth belt for travel to and through the curing station.

When the lids with their sealing material cured leave the curing station, they move to the next transfer zone where a diverter intercepts each row and realigns it into a single file stream which travels onward to an assembly zone.

At this latter zone the lids are sequentially fed into an assembly machine. At the same time a series of flanged closure bands are delivered flange up from a source of supply sequentially to the assembly machine where they are arranged with the lids in sets of one lid and one band with the lids spaced slightly above the bands and in vertical registry. The sets then move sequentially through the machine along a predetermined path and, intermediate the ends of the path, each lid is moved downward into seating relation with its mating band. The complete closure assemblies then move onward to the packing station. There are no manual operations in this entire sequence and the lids are completely protected against damage and against any displacement of the sealing material.

BRIEF DESCRIPTION OF THE DRAWINGS

Various other advantages and features of novelty will become apparent as the description proceeds in conjunction with the accompanying drawings, in which:

FIG. 4 is a top plan view, on line 4—4, of a portion of the stationary magnet of FIG. 3;

FIG. 5 is a sectional view taken on line 5-5 of FIG. 4;

FIG. 6 is an elevational view, on line 6—6 of FIG. 3, showing the magnetized rotatable pulley;

FIG. 7 is a side elevational view, on line 7—7 of FIG. 1, of the infeed conveyor means for conveying lids from the inverting apparatus of FIGS. 2 and 3;

FIG. 8 is a sectional view taken on line 8—8 of FIG. 7;

FIG. 9 is an end elevational view of the stop means or positioner, of FIG. 7;

FIG. 10 is a plan view of the infeed disc, the coating table, and the carousel for removing lids from the coating table;

FIG. 11 is a sectional view taken on line 11—11 of FIG. 10;

FIG. 12 is an elevational view of the coating means for applying sealing material to lids carried on the coating table of FIG. 10;

FIG. 17 is a side elevational view of a portion of the conveyor shown in FIG. 10;

FIG. 18 is an end view of the conveyor shown in FIG. 17;

FIG. 19 is a top plan view of a portion of the conveyor shown in FIG. 17;

FIG. 20 is a schematic sectional view on line 20—20 of FIG. 19;

FIG. 21 is a side elevational view of portions of two conveyors at a transfer zone;

FIG. 22 is an elevational view of portions of two conveyors at another transfer zone;

FIG. 23 is an elevational view, partly in section, of an independent magnet and release means;

DESCRIPTION OF PREFERRED EMBODIMENTS

Figure 1:
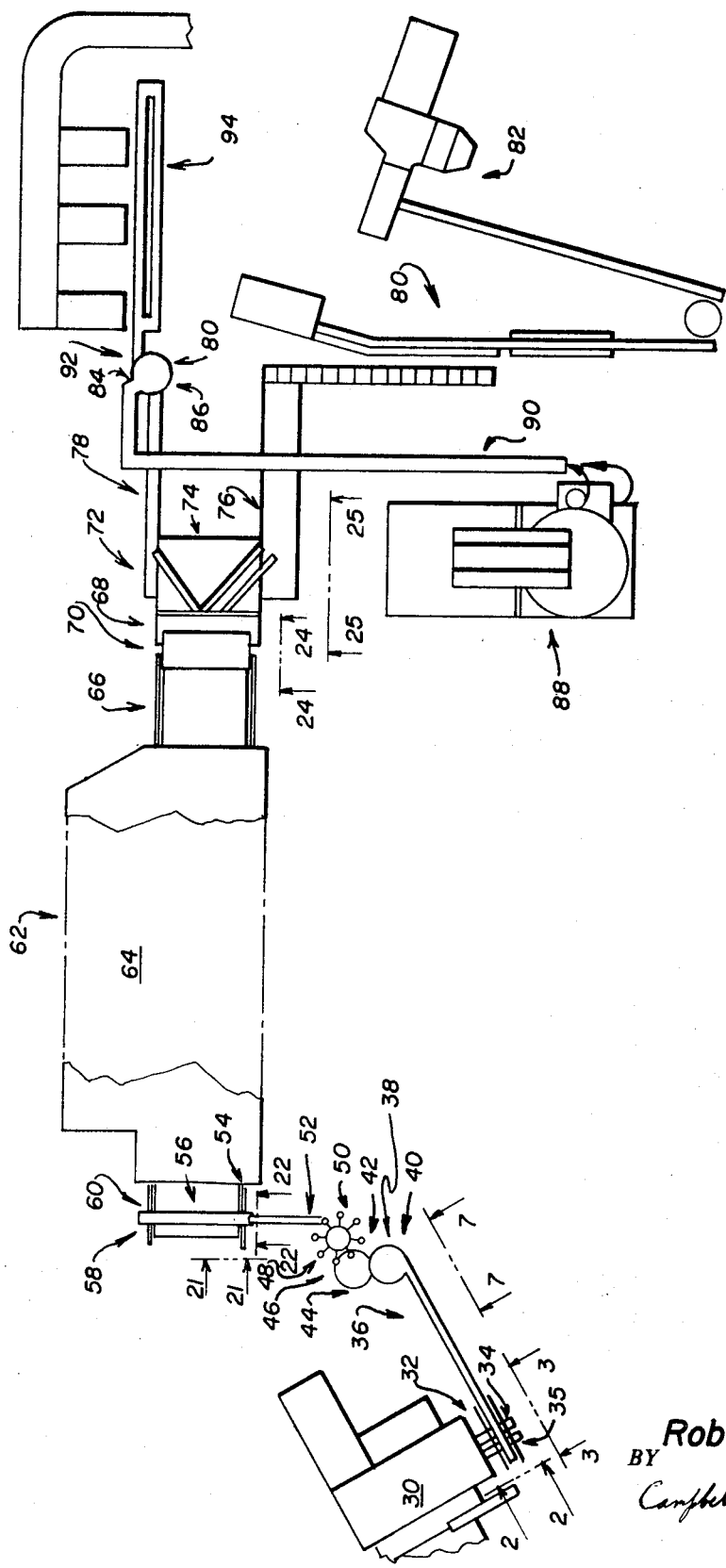
FIG. 1 is a schematic view, in plan form, showing the various parts of an apparatus constructed in accordance with the invention.

The total apparatus for the practice of the invention is schematically illustrated in FIG. 1, where a stamping and forming machine 30 operates continuously to stamp discs from sheet stock and form them into closure lids by producing a concave sealing margin around the entire periphery of the lid, which margin is coated with a thin layer of sealing material, which may be latex or a plastisol, the latter being presently preferred. The plastisol is subsequently cured in an oven to a rubber-like consistency and is adapted to make sealing contact with the mouth of a typical Mason-type jar in use.

The machine 30 sequentially supplies lids with their first, or sealing, face down to a first conveyor 32. The conveyor then sequentially delivers the lids to a first transfer zone 34, where inverter means 35 inverts the lids and moves them onward. The inverter means includes the delivery end of a second conveyor 36. By the use of magnetic means to be later described, the lids are sequentially transferred to the second conveyor with their second faces in contact with the conveyor belt, and are held in contact with the belt while it passes around an end loop pulley, with the result that the lids now travel along the upper pass of the second conveyor with their first faces up.

The second conveyor now delivers the lids sequentially to a second transfer zone 38 where an automatically controlled stop means 40 allows them to pass individually to a second transfer means 42 including a star wheel which feeds the lids sequentially into a first treating zone 44 and onto a coating machine 46. The latter applies the plastisol coating to the concave marginal seat of each lid as they move through the treating zone to the third transfer zone 48. A third transfer means in the form of a carousel 50 picks up each lid and moves it to the adjacent receiving end of a third conveyor 52.

Conveyor 52 moves the lids sequentially to a fourth transfer zone 54, where a fourth conveyor 56 picks them up from the third conveyor and delivers them to a fifth transfer zone 58 and deposits them on a fifth conveyor 60. The latter is provided with a belt much wider than those of the previous conveyors and it is arranged to travel in a direction perpendicular to the path of travel of the fourth conveyor. The delivery end of conveyor 56 overlies the entire width of the receiving end of conveyor 60 and is arranged to simultaneously deposit a plurality of lids on conveyor 60 in a row transverse to the path of travel of conveyor 60. This operation is repeated successively so that conveyor 60 continuously receives such transverse rows.

Conveyor 60 moves the rows of lids onward to a second treating zone 62 where they pass through a curing station 64 and on to a sixth transfer zone 66, where they are transferred to a sixth conveyor 68 with the aid of a seventh conveyor 70 overlying the adjacent ends of conveyors 60 and 68. Conveyor 68 moves the rows of lids onward to a seventh transfer zone 72, and at this zone a diverter 74 intercepts the rows and realigns them to travel diagonally in single file onto the receiving end of an eighth conveyor 76. Alternatively, the diverter 74 may be arranged to divide the rows and send a portion of each to a ninth conveyor 78.

Those lids which are deposited on conveyor 76 travel onward to an assembly zone 80 where they are arranged in sets, such as a dozen or a half dozen, and placed in boxes. The boxes then move on to a packaging station 82 where they are packed in larger cartons ready for shipping.

Those lids which are deposited on conveyor 78 travel onward to a second assembly zone 84 where they are fed sequentially into an assembly machine 86. Flanged closure bands from a source of supply 88 are deposited on a tenth conveyor 90 which delivers them to assembly zone 84 and feeds them sequentially into assembly machine 86. The machine aligns sets of one lid and one band in registry, seats each lid in its band and deposits them on eleventh conveyor 92 which delivers them to second packaging zone 94 to be packed and shipped

STAMPING AND FORMING MEANS — FIRST CONVEYOR

The stamping and forming machine 30 is a high-speed closure press capable of stamping and forming closure lids at a high rate of speed, e.g., at the rate of 500 per minute or more for lids up to a diameter of about 86 mm. Any one of a number of commercially available presses may be used for this phase of the operation. Although the press shown in the drawings includes a two-out die, it is to be understood that the number of dies may vary as desired or required.

As the lids 100 are ejected from machine 30, they slide down inclined ramp 102 onto the conveyor 32 for delivery to the first transfer zone 34. Since the machine is equipped with two side-by-side dies, the lids come to the conveyor in laterally spaced relation. Therefore, conveyor 32 is provided with two laterally spaced belts 104, 106, preferably of the fabric type, which are aligned with the delivery paths of the lids 100. The dies of machine 30 operate alternately and accordingly, the lids are deposited in a staggered array. In order that a pair of lids may arrive simultaneously at the first transfer zone in side-by-side relation, the two belts are individually speed-controlled so that one will travel slightly faster than the other. One preferred way is through the appropriate selection of the size of the sprockets which drive the belts. Since machine 30 delivers the lids to conveyor 32 with their first, or sealing, faces down, it is necessary to invert them before they are delivered to the first treating zone where the sealing material is to be applied to the concave seats.

INVERTER MEANS

The lids are conventionally made from commercially available tin plate which is a paramagnetic material, and it is therefore possible to utilize magnetic means for inverting the lids and carrying out other steps in the process. The inverter means 35 for automatically inverting the lids as they are transferred from the first conveyor 32 to the second conveyor 36 will now be described.

Figure 2:
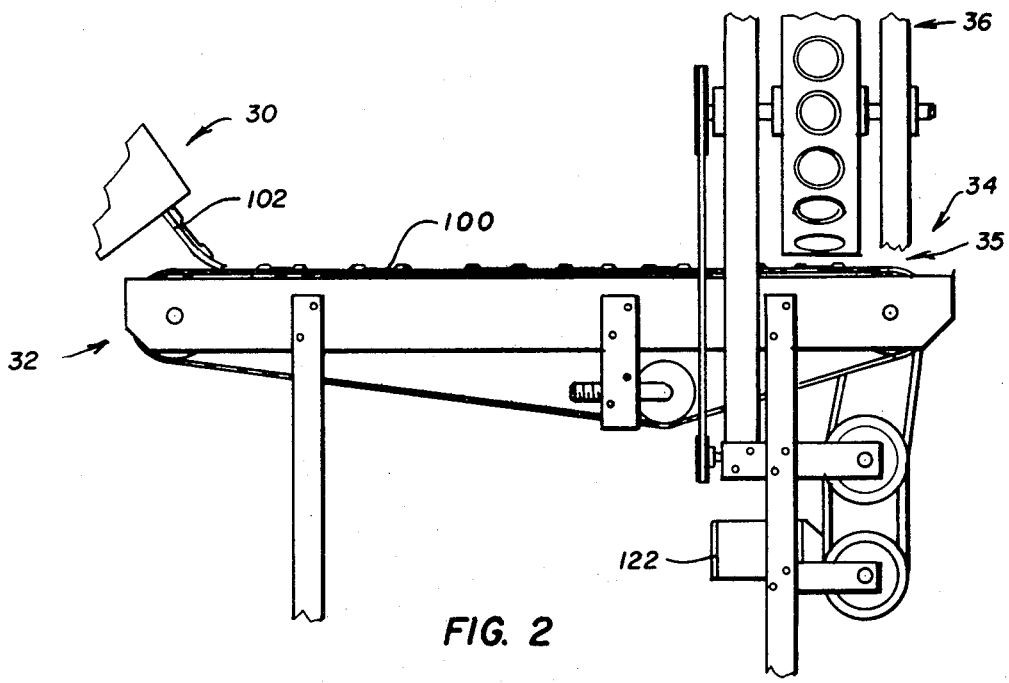
FIG. 2 is a side elevational view, on line 2—2 of FIG. 1, of the means for automatically inverting closure lids while transferring same between conveyors.
Figure 3:
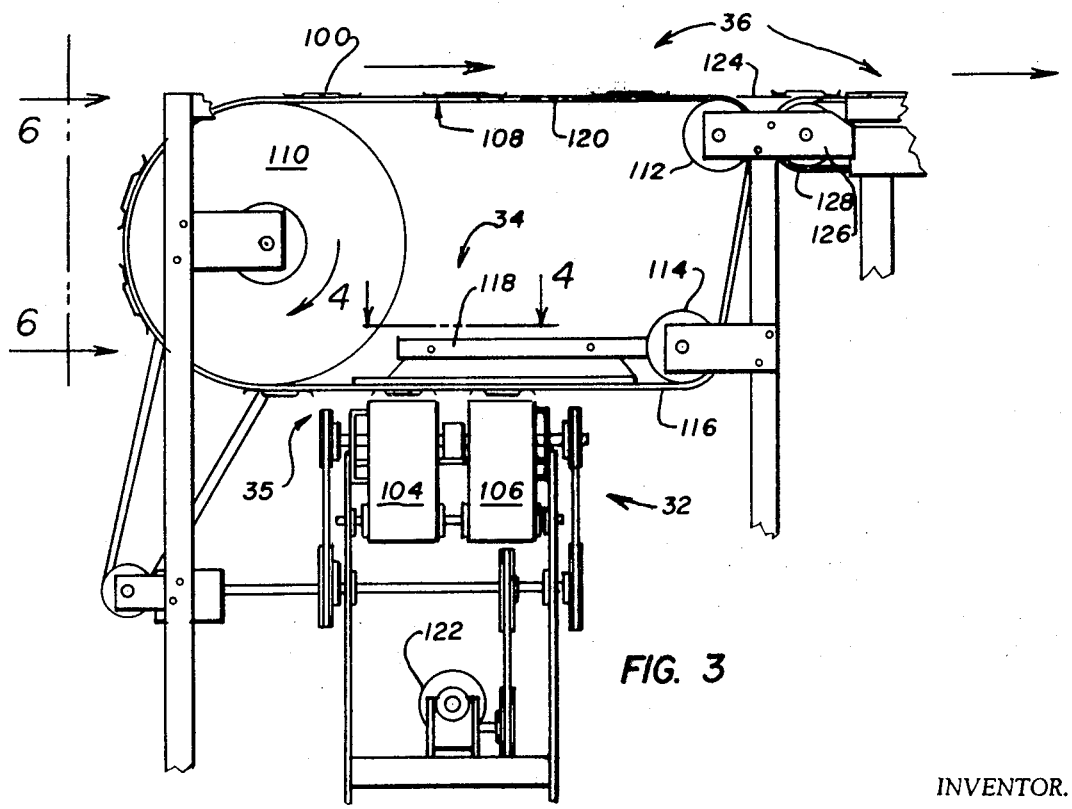
FIG. 3 is a front elevational view, on line 3—3 of FIG. 1, of the apparatus of FIG. 2.

Considering FIGS. 1 to 3 particularly, it will be noted that conveyors 32 and 36 travel essentially horizontally, as do the other conveyors in the apparatus. The longitudinal axis of conveyor 36 is substantially perpendicular to that of conveyor 32 and it is provided with a first single endless loop type belt 108 carried by pulleys 110, 112, and 114, so that it traverses the delivery end of belts 104 and 106 as best seen in FIG. 3. The lower pass 116 of belt 108 is spaced above belts 104 and 106 sufficiently to provide a slight clearance for lids 100. A stationary magnet 118 is mounted closely above lower pass 116 at the juncture of the two conveyors and creates a magnetic field which picks up each pair of lids as they arrive at the transfer zone and retains them with their second faces in contact with belt 108.

Pulley 110 guides the belt in an upward arc of about 180 degrees and is magnetized to retain the lids in contact with the belt. The pulley is laterally adjacent to conveyor 32 as well as to magnet 118 and therefore as the lids are moved to the left, viewed in FIG. 3, until they leave the field of magnet 118 they are subjected to the magnetic field of the pulley so that the field is substantially continuous. When they have completed their arcuate movement they are in inverted attitude on the upper pass 120 of belt 108, with their first faces up.

The first and second conveyors are driven through various conventional sprockets and chains by motor 122, and the drive ratios are selected to give the desired results. It is, of course, essential that the pickup of one pair of lids is not interfered with by the arrival of the next pair at the transfer point. Considering FIG. 3, it will be apparent that the lid picked up from belt 106 must be carried to the left of belt 104 before the next pair of lids arrives. Therefore the speed of belts 104 and 106 is selected relative to the rate of production of machine 30 to provide substantial gaps between each successive pair of lids, and belt 108 is driven at a greater lineal speed than belts 104 and 106. It will be noted that the transfer of the lids from the first conveyor to the second conveyor results in changing them from a dual line to a single file arrangement which is desired for certain subsequent operations.

Continued movement of belt 108 brings the lids to transfer plate 124 which bridges a narrow gap between pulley 112 and pulley 126 which guides the reversal of belts 128 and 130, the latter two belts constituting a continuation of conveyor 36. The upper surface of transfer plate 124 is provided with a plating or a coating of a low friction plastic material, and the momentum of the lids is sufficient to cause them to slide across plate 124 and onto continuation belts 128 and 130. If any of the lids slows down, it will be pushed across by succeeding lids.

The fixed or stationary magnet 118 of FIG. 2 is shown in greater detail in FIGS. 4 and 5 where the magnet body 132 is in the form of a rectangular parallelopiped and is flanked by a pair of paramagnetic bars 134 of angle cross section. The body 132 consists of a commercially available ceramic encapsulated magnet, and all other magnets used in the apparatus are of a similar type. Pulley 110 is made of three paramagnetic discs 136 sandwiching two magnet discs 138 between them as seen in FIG. 6.

INFEED CONVEYOR AND AUTOMATIC STOP

Referring now to FIGS. 1, and 7 to 9, the infeed conveyor means 36 and the automatic stop means 40 will now be described. That portion of conveyor 36 which appears in FIG. 7 serves to move the lids 100 onward from transfer plate 124 to the transfer zone 38, where the automatic stop means 40 controls their advance to the second transfer means 42. The conveyor includes the laterally spaced belts 128 and 130 which travel in a longitudinal passage formed by angle members 140 and flat bed 142 carried by support 144, the belts being driven by motor 146. Each member 140 has a recessed portion or notch 148 formed on the lower inner surface thereof. These notches and the underlying portion of belts 128 and 130 cooperate to form passageways for the peripheries of the lids as they move along on the belts and the vertical space is just sufficient for free movement of the lids. Consequently, no lid can rise sufficiently to overlie a portion of an adjacent lid and cause jamming. The belts are provided with low friction surfaces which will move the lids onward against no resistance but which will readily slide under the lids when they are stopped for control reasons.

The automatic stop means 40 includes a plate 150, attached by bracket 152 to support 144 and located at the end of conveyor 36 as a continuation of the upper surfaces of belts 128 and 130. A bellcrank 154 is pivotally mounted on the plate at 156 for rotation clockwise and counter clockwise and its upper arm 158 is provided with a resilient stop member 160 to block or allow passage of lids through the transfer zone. The lower arm 162 is pivotally connected at 164 to the piston rod 166 of the double acting air cylinder 163 which in turn is pivotally connected to bracket 170 depending from plate 150. Counterclockwise movement of arm 162 is limited by contact with stop 172. When cylinder 168 is actuated by a valve to be described later, stop member 160 rises to allow a lid to pass. The valve then reverses the cylinder 168 to lower stop member 160 and block passage of further lids.

The conveyor 36 must function to provide a sufficient backlog of lids for continuous operation of the succeeding portions of the apparatus at an optimum rate. Therefore, the rate at which lids are moved along conveyor 36 should always be slightly in excess of machine 30 and conveyor 32. Hence the machine 30 and conveyor 32 are normally operated at a supply rate slightly less than the rate of conveyor 36.

Two automatic controls are provided to coordinate these operations. As shown in FIG. 8, a light passage 174 is formed in members 142 and 144, and light source 176 is located below the passage and a photocell 178 is located above the passage. If the photocell fails to detect light for too long a period of time, this means that there are too many lids being stamped and delivered to conveyor 36. In this situation the appropriate signal from the photocell may be used to slow down or stop machine 30 temporarily until the backlog becomes normal.

A second automatic control may be used to insure an adequate backlog for subsequent operations. Light source 180 and photocell 182, FIG. 7, are arranged in the same way as those previously described but are located a short distance upstream from automatic stop means 40. As long as there are lids backed up to this point, photocell 182 will not detect light and it will allow stop means 40 to function as described. However, if the supply dwindles and photocell 182 sees light, it will transmit a signal to stop action of stop means 40 and the subsequent treating operation until the desired backlog of lids is again present.

FIRST TREATING ZONE

Turning now to FIGS. 1, and 10 to 12, the apparatus and operations in the first treating zone will now be described. Assuming that there is an adequate backlog of lids on conveyor 36, the stop means 40 will sequentially allow the advance of lids to the second transfer means 42. This includes an arcuate plate 184 having an upstanding guide flange 186, on which is mounted for rotation on a vertical axis star wheel 188 having a series of evenly peripherally spaced arms 190 defining between them notches 192 to receive and move individual lids. The lids are guided between the notches and flange 186 to be sequentially delivered to coating table 194. The table also rotates about a vertical axis and is provided with evenly peripherally spaced coating stations 196, each adapted to receive and carry one lid through the coating operation. The movements of the star wheel and coating table are coordinated so that each lid will be deposited in exact registry with its respective coating station.

Actuation of the air cylinder 168 of stop means 40 of FIGS. 7 and 9 is controlled by photocell 182 and light source 180. Whenever there is an insufficient amount of lids disposed upon the infeed conveyor means 36 such that light is transmitted from light source 180 to the photocell 182, a signal is generated which is used to actuate stop means 40 thereby preventing lids from flowing past said stop means 40. The signal so generated is transmitted to a solenoid 200, see FIG. 10. The solenoid 200 in turn actuates an air valve 202 to open communication through conduit 204 with a source of pressurized air, not shown, and through conduit 208 with cylinder 168 to lower stop 160 and prevent a lid to pass. As soon as a supply of lids increases sufficiently that light no longer reaches photocell 198, valve 202 is reversed and pressurized air flows through conduit 206 to cylinder 168, causing it to raise stop 160. Exhaust air passes from the cylinder through conduit 208, the valve 202 and conduit 210 to the atmosphere. Thus, transmission of a light beam to photocell 182 is used to control the feeding of lids to the star wheel 188.

In the event that the previous feed mechanism fails to supply a lid to any one of notches 192 in the star wheel the result would be an empty coating station, and it would be necessary to stop the coating operation to avoid depositing coating material directly on a coating station which would then have to be cleaned out before operations could continue. Accordingly, an emergency control system is provided as illustrated in FIGS. 10 and 11. An aperture 212 is provided in plate 184 and a light source 214 and photocell 216 are vertically aligned with it. The aperture is so located that it will be covered by each arm 190 and uncovered by each notch 192. If a lid is properly in place in each notch as indicated in FIG. 11, no light will reach photocell 216 and it will not be actuated. However, if a lid is absent, light will reach photocell 216 and it will transmit a signal to stop the coating operation.

As previously stated, the star wheel 188 is coordinated with table 194 so that it deposits lids one at a time to the coating stations 196, the upper surface of each station being disposed slightly below the surface of plate 184 to facilitate transfer. Each lid is secured against the upper surface of its respective station by suitable means, not shown, such as a magnet or a source of reduced pressure. Each coating station is mounted in an opening in table 194 for rotation about its own axis and means are provided for causing such rotation at a rate which will cause a full revolution while the table is passing through a partial rotation.

A support ring 218 is mounted directly above table 194 and fixed thereto so that it rotates with the table at the same rate of speed. Mounted on ring 218 are a plurality of spray nozzles 220, one for each coating station, and they are located so that the tip of each nozzle is directly above the margin of one of the stations. They are controlled to discharge sealing material during about one half of each revolution of the table, commencing shortly after a lid is deposited on a station. Since the lids are secured to the stations, they will each make a full revolution about their own vertical axis during the time their respective nozzles are in operation. As a result, each will receive a full annular coating 222 of sealing material in their concave seats which is later to serve as a gasket. Following the application of the sealing material, continued rotation of the coating table sequentially brings each lid to a point adjacent to the third transfer zone, and the means for securing them against the coating stations are released.

THIRD TRANSFER ZONE

Referring now to FIGS. 1, 10, and 13 to 16, the construction and operation of the third transfer means 50 for removing lids from the coating table, carrying them through the third transfer zone 48, and delivering them to the third conveyor 52 will now be described. Transfer means 50 comprises a support 224 and a carousel 226 mounted on the support for rotation about a vertical axis. A base plate 228 is fixedly attached to support 224 and provided with a central opening 230 through which extends rotatable drive shaft 232. The carousel includes a rotor plate 234 to which a series of radially extending pickup arms 236 are attached by means of pivot pins 238 to provide individual movement of each arm in a vertical plane. Mounted on base plate 228 are cams 240 and 242, each adapted to be engaged by a cam follower 244 on each arm 236 once in each revolution to cause raising of the inner end and lowering of the outer end of each arm. The arms are normally held in a position with their outer ends raised by a spring 246 compressed between a boss 248 and the under side of rotor plate 234.

Figure 13:
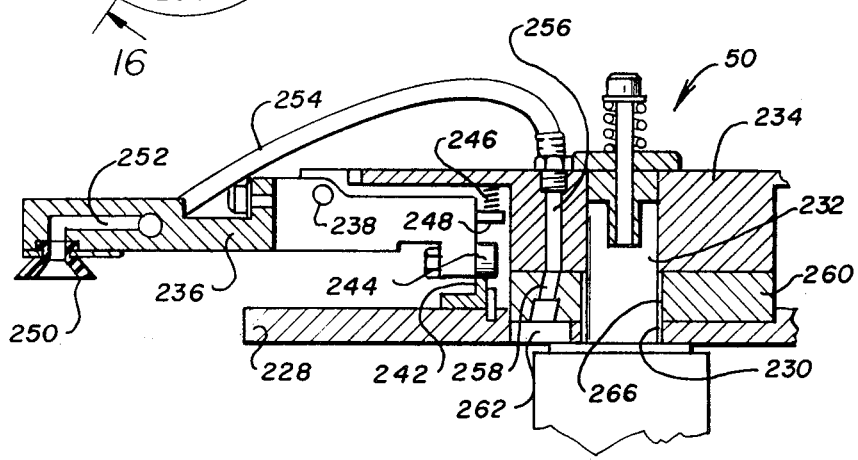
FIG. 13 is a sectional view taken on line 13—13 of FIG 10.

As seen in FIG. 13, the outer end of each arm 236 is provided with a pickup device in the form of a conically shaped flexible suction cup 250. The cup is in communication with a passageway 252 formed in the arm. The passageway is in turn disposed in communication with a flexible air line or tube 254. The flexible tube is disposed in communication with a passageway 256 formed in rotor plate 234 and intermittently in communication with a passageway 258 formed in bearing plate 260 and an aperture 262 formed in base plate 228, the latter aperture being open to ambient pressure.

Figure 16:
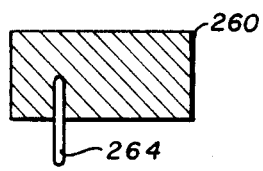
FIG. 16 is a sectional view taken on line 16—16 of FIG. 15.

Bearing plate 260 is securely attached to base plate 228 by means of pin 264, shown in FIG. 16, to prevent relative rotation and misalignment of passageway 258 and aperture 262, and also is provided with a central opening 266 to allow passage and roration of drive shaft 232. Plate 260 is also provided with an aperture 268 adapted to be placed in intermittent communication with passageway 256 of member 234. Aperture 268 is connected to a source of reduced pressure, not shown. As may be seen in FIG. 15, the apertures 258 and 268 are circumferentially spaced from each other by approximately 165 degrees.

Referring now to FIGS. 10, 13, and 16, the operation of the carousel transfer means 50 will now be described. As the cam follower 244 of one of the arms 236 engages the leading edge of the cam 240, the inner end of the arm is raised against the pressure of spring 246 and the outer end is lowered. As the suction cup 250 engages a portion of the lid disposed on the station 196 which is momentarily at the point of contact of the paths of travel of the pickup devices and the stations, the interior of the suction cup is disposed in communication with a source of reduced pressure, and the cup picks up the lid and holds it securely.

As arm 236 continues to rotate about a vertical axis, the cam follower 244 moves out of contact with cam 242, permitting the outer end of the arm and its pickup device to move upwardly by a predetermined amount. As arm 236 continues to rotate, its cam follower 244 comes into contact with cam 242, thereby once again causing arm 236 to move about its pivot 238 until its outer end and the pickup device 250 move downwardly a predetermined amount. When the arm has rotated approximately 165°, the interior of the suction cup is disposed in communication with ambient pressure by way pf passageways 256, 258, and 262, and the suction cup releases the lid onto the adjacent end of conveyor 52. Continues rotation of arm 236 results in disengagement of its cam follower 244 from cam 242, and the suction cup 250 moves upwardly and away from the lid. It will be understood that a good sealing contact must be maintained between the arm 234 and bearing plate 260 during the 165° travel in order to maintain the vacuum produced at the suction cup 250 until it reaches the point of deposit of the lid on conveyor 52.

Figure 14:
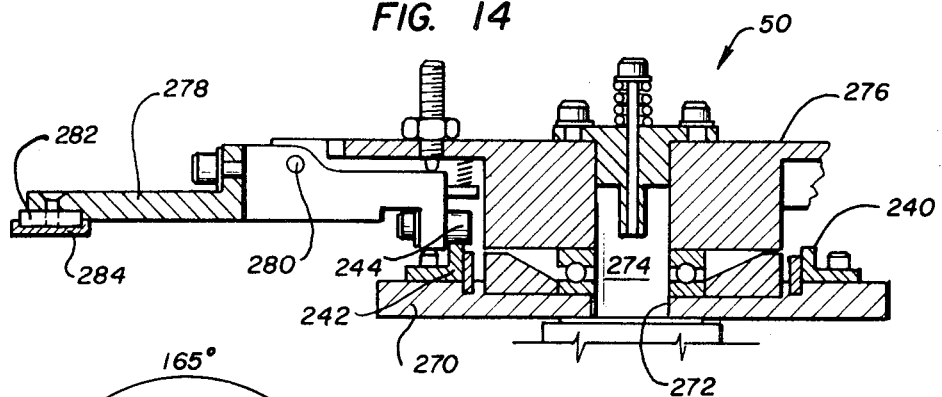
FIG. 14 is a view similar to FIG. 13 showing a modified form of pickup device.
Figure 15:
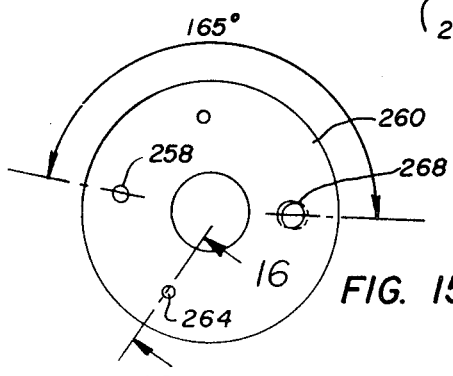
FIG. 15 is a schematic plan view of one of the rotor plates shown in FIG. 13.

A variant of the carousel 226 is illustrated in FIG. 14. In this form, a base plate 270 is provided with an opening 272 for passage of rotatable drive shaft 274 secured to rotor plate 276 at its upper end. Cams 240 and 242 are secured to the base plate in the same locations. Pickup arms 278 are pivoted to rotor plate 276 by pins 280 as before and carry cam followers 244 to cause lowering of the outer ends of the arms at the same points in their rotation. In this case the suction cups are replaced by magnets 282 secured to the outer ends of arms 278. Each magnet is provided on its lower face with a layer 284 of material which is non-magnetic and has a low coefficient of friction, such as a plastic material. The carousel operates in the same way as in the previous form except that the pickup device lifts the lids by means of the magnetic field created by magnet 282. When magnet 282 overlies the adjacent end of conveyor 52 the lid is released and drawn down onto the conveyor by means of another magnet, later described, which overcomes the force of magnet 282. A passage 286 extends through the end of arm 278, the magnet 282, and the coating 284 to eliminate any suction effect which might hinder withdrawal of the lid.

Bearing in mind the fact that, although the plastisol used as the sealing material is considered as a viscous material, it can flow on the upper surface of the lid if the latter is subjected to any sudden movements or vibrations. Thus, it is necessary to reduce disturbance to a minimum until the lids reach the curing station. For this reason the apparatus described above is arranged and coordinated so that, at the pickup point in FIG. 10, the circular paths of travel of the pickup devices and the coating stations are "tangent", and the pickup devices and stations are traveling in the same direction at the same speed. Also at the point of deposit on conveyor 52, the pickup device is traveling at the same speed and in the same direction as the conveyor belt. Thus there are no abrupt changes of direction or speed to disturb the flowable sealing material.

THIRD CONVEYOR

Referring to FIGS. 1, and 17 and 20, the third conveyor 52 will now be described. This conveyor comprises a belt 288 of the chain type to facilitate timing with the carousel and the succeeding conveyor. However, it is to be understood that a fabric type belt can be used in this and all other locations with appropriate sprocket drive where accurate timing is desired, and the term "endless loop belt" refers to any type belt suitable for use in the apparatus. The belt actually comprises two laterally spaced chains as shown in FIG. 18 each carried on a sprocket 290 at each end of the conveyor and driven by a motor not shown. Detents 292 are evenly spaced along each chain and define between them spaced areas or seats to receive individual lids. A series of tabs 294 are secured to both chains between the detents to provide primary support for the lids.

An elongate bar magnet 296 is arranged to closely underlie the belt and extends from the end shown in FIG. 17 to a point somewhat short of the delivery end of the conveyor. When the pickup device 250 releases a lid it is pulled down into seating engagement on the tabs 294. In the case of the magnetic pickup device 282, the magnet 296 is considerably stronger and pulls the lid away from the pickup device. During their course of travel on the conveyor, the lids are held securely on the belt by the field of magnet 296 and therefore they are subject to minimum disturbance.

FOURTH AND FIFTH TRANSFER ZONES

Referring now to FIGS. 1, and 21 to 23, the construction and operation of the fourth conveyor 56, together with associated elements, in the fourth and fifth transfer zones will now be described. Conveyor 56 essentially comprises belt 298 in the form of chains trained over sprockets 300 at both ends of the conveyor, the sprockets 300 being driven by sprockets 290, and magnetic pickup devices 302 secured to the belt 298 at exactly the same spacing as the lid seats on belt 288.

As will be observed at the right hand end of FIG. 21, the receiving end of the fourth conveyor 56 overlies the delivery end of the third conveyor 52 in slightly spaced relation and overlaps it by an amount slightly greater than the extent of one lid seat on belt 288. Belts 288 and 298 are coordinated so that they travel at the same lineal speed and each successive pickup device 302 travels directly over the center of the cooperating lid seat on belt 288. Thus at the transfer point each device 302 picks up the underlying lid and carries it onward, to the left in FIG. 21, to bring it over the appropriate part of the fifth conveyor belt 60 in the fifth transfer zone 58. Belt 60 is considerably wider than the previous belts, being capable of receiving a row of as many as 18 or 20 lids, extending transversely of its length and direction of travel. As shown in FIGS. 21 and 22 belt 60 travels in a direction perpendicular to the direction of travel of belt 298. Means to be described later cause the magnetic pickup devices 302 to release a plurality of lids simultaneously on the receiving end of belt 60 to form the transverse rows mentioned. The release means acts intermittently so that a continuous series of transverse rows of lids are deposited on belt 60 at longitudinal intervals.

The releasable magnetic pickup devices 302 are illustrated in detail in FIG. 23. Each device comprises a cylindrical body 304 having a bore 306 for the passage of a shaft, a first counter bore 308 for the reception of a spring, and a second, larger counterbore 310 to receive a magnet. Each body is mounted on belt 298 so that the magnet end faces outwardly of the belt. Magnet 312 is press fitted into counterbore 310 and is provided with a central bore 314. A plunger 316 is slidably mounted in bores 306 and 314 and provided with a head 318 which overlies the outer end of the magnet, the head being provided with a relief opening 320 to prevent a vacuum drag which might interfere with release of a lid. The outer face of the head 318 is coated with a layer 322 of a material having a low coefficient of friction and being unaffected by a magnetic field, such as a suitable plastic, the head having a large vacuum breaking opening 324.

Magnet 312 confines a compression spring 326 in counterbore 308, and a snap ring 328 on plunger 316 engages the upper end of the spring to yieldingly hold the plunger in retracted position. When the plunger is fully retracted, the field of magnet 312 is strong enough to extend outwardly beyond the plunger head and layer 322 and pick up a lid from belt 288 and retain it for delivery to transfer zone 58. When a pickup device reaches the appropriate location in the transfer zone, a release member 330 presses plunger 316 downwardly and outwardly, and head 318 moves correspondingly to lower lid 100 to such an extent that the lifting force of magnet 312 is and the lid is released to conveyor 60.

The release mechanism to operate member 330, which is an elongate bar, includes a chain 332 driven by a sprocket, not shown, which is mounted on the same shaft as sprocket 300. The chain drives gear 334, which engages idler gear 336 to drive gear 338 in a clockwise direction as viewed in FIG. 21. Gear 338 carries a cam 340, which engages cam follower 342 of lever arm 344 once in each revolution of gear 338 to raise the arm clockwise about its pivotal mounting 346.

Release rotor 348 is connected by means of a slip clutch, not shown, to a power source such as the drive shaft of sprocket 300 to be rotated clockwise when not blocked. The end 350 of lever arm 344 serves as a stop to engage detent 352 on rotor 348. When cam 340 of gear 338 engages cam follower 342, arm 344 rises sufficiently to disengage its stop 350 from detent 352 and allow rotor 348 to rotate. However, as soon as cam 340 passes cam follower 342, the arm 344 again lowers, and its stop 350 rides on the surface of rotor 348 to intercept detent 352, limiting the rotor to one full turn for each full turn of gear 338. The rotor operates more rapidly than gear 338 in order to perform its release function during minimum travel of belt 298.

Release rotor 348 drives support rotors 354 and 356 in a positive manner through chains 358 and 360 and sprockets not shown so that the support rotors will make 1 full revolution each time the release rotor makes 1 full revolution. Release bar 330 is arranged horizontally closely spaced above the lower pass of belt 298 and a plurality of magnetic pickup devices 302. The bar is eccentrically mounted to rotors 354 and 356 by pivot pins 362 and 364 which are directly to the right of the rotor centers when the rotors are at rest. Hence, each time rotor 348 is released, rotors 354 and 356 immediately move bar 330 down to contact a plurality of plungers 316 and release a corresponding number of lids. This is accomplished in the first 90 degrees of movement of the rotors and during the remainder of their rotation the bar is raised and returned to its original position, ready for the next cycle. Thus it will be seen that the release mechanism operates intermittently to deposit transverse rows of lids on conveyor 60 while conveyor 56 runs continuously. The length of bar 330 is selected to release the desired number of lids in each cycle.

SECOND TREATING ZONE — CURING STATION

Conveyor 60 is operated at a selected speed to produce the desired longitudinal gap between the transverse rows of lids and this is normally much slower than the lineal speed of conveyor 56. Referring to FIG. 1, conveyor 60 carries the rows of lids to and through the second treating zone 62 and its curing station 64, where they are subjected to predetermined elevated temperatures for a sufficient period of time to allow the sealing material 222 to cure and set up. Since the apparatus shown in FIG. 1 may utilize any one of a number of conventionally available curing chambers or ovens, further discussion of the construction and operation of such equipment is not deemed necessary.

SIXTH TRANSFER ZONE

Figure 24:
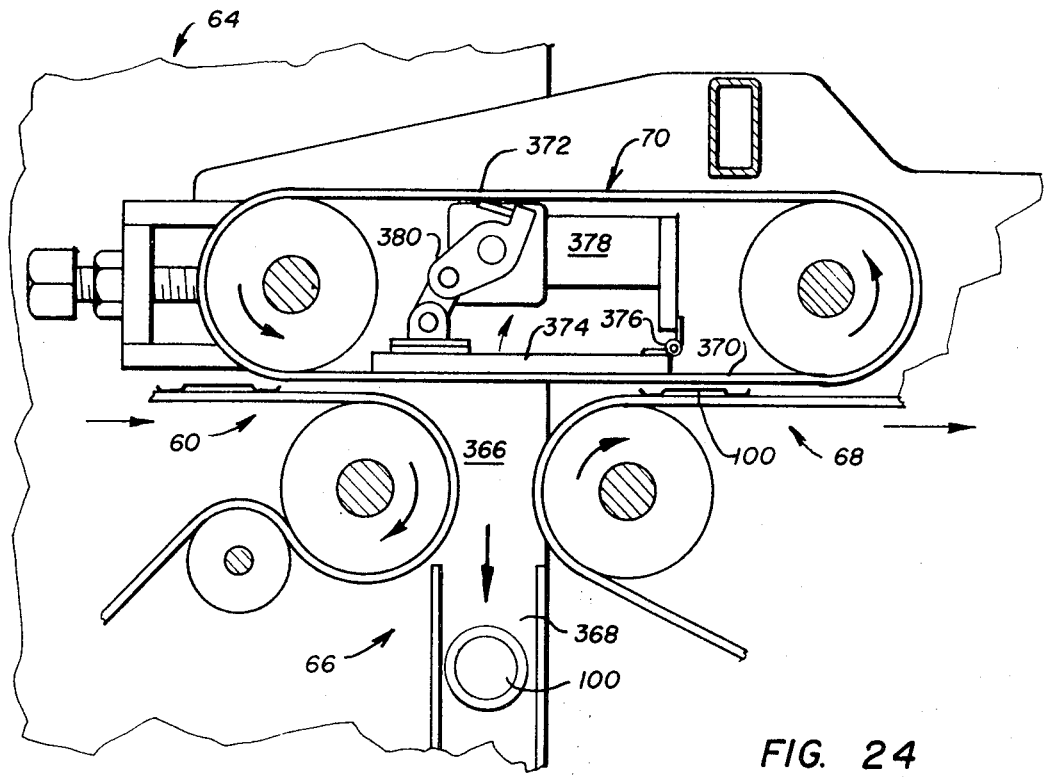
FIG. 24 is a side elevational view of a set of three conveyors at a transfer zone.

Referring now to FIGS. 1 and 24, the construction and operation of the apparatus for removing lids from the curing station and moving them onward through the sixth transfer zone 66 will now be described. Conveyor 60 carries the transverse rows of lids onward from zone 58 to and through the curing station and to zone 66 at a relatively low lineal rate to provide time for curing. A sixth conveyor 68 is located at zone 66 and is arranged in longitudinal alignment with conveyor 60 and located to define a longitudinal gap 366 between the delivery end of conveyor 60 and the receiving end of conveyor 68. A diversion passage 368 communicates with gap 366 and leads downward to a storage area for purposes to be described later.

Conveyor 68 operates at a much higher lineal speed than conveyor 60 and its belt is provided with a coating, such as a suitable plastic, which has a very low coefficient of friction. A seventh conveyor 70 is located at the transfer zone, aligned longitudinally with the other two and arranged above them so that the lower pass 370 of its belt 372 is spaced slightly above the confronting ends of conveyors 60 and 68, said lower pass traveling in the same direction as the upper passes of the others.

An elongate magnet 374 is arranged just above lower pass 370 of belt 372 and extends over the ends of conveyors 60 and 68. As a lid 100 approaches the end of conveyor 60 it is subjected to the field of magnet 374 and drawn up against lower pass 370 of belt 372. The belt moves it through the magnetic field until it is downstream of the field and the lid then drops onto conveyor 68. The magnet, of course, extends entirely across the width of the conveyors and hence acts on entire transverse rows of lids at the same time.

In the event of jamming or other difficulty at a downstream point in the system, it will be apparent that the flow of lids through the curing station cannot be stopped because the sealing material would be overcured and the lids would be unusable. Therefore, the magnet 374 is pivotally mounted at 376 to swing upwardly at the end overlying conveyor 60. A servo motor 378 is connected through linkage 380 to end of magnet 374, and acts in response to a trouble signal from downstream to raise the end of the magnet to such an extent that its field will not raise the oncoming lids into contact with belt 372. As a result, such lids will fall in the gap 366 and pass through diversion passage 368 to a storage area. These lids are later sorted and packed manually.

SEVENTH TRANSFER ZONE

Figure 25:
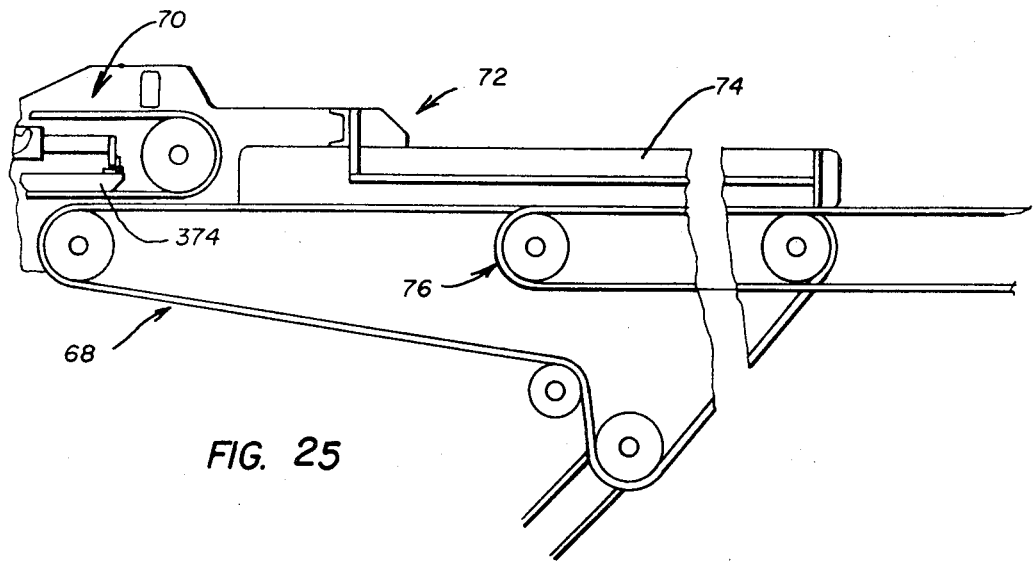
FIG. 25 is a side elevational view of three conveyors and a diverter at another transfer zone.
Figure 26:
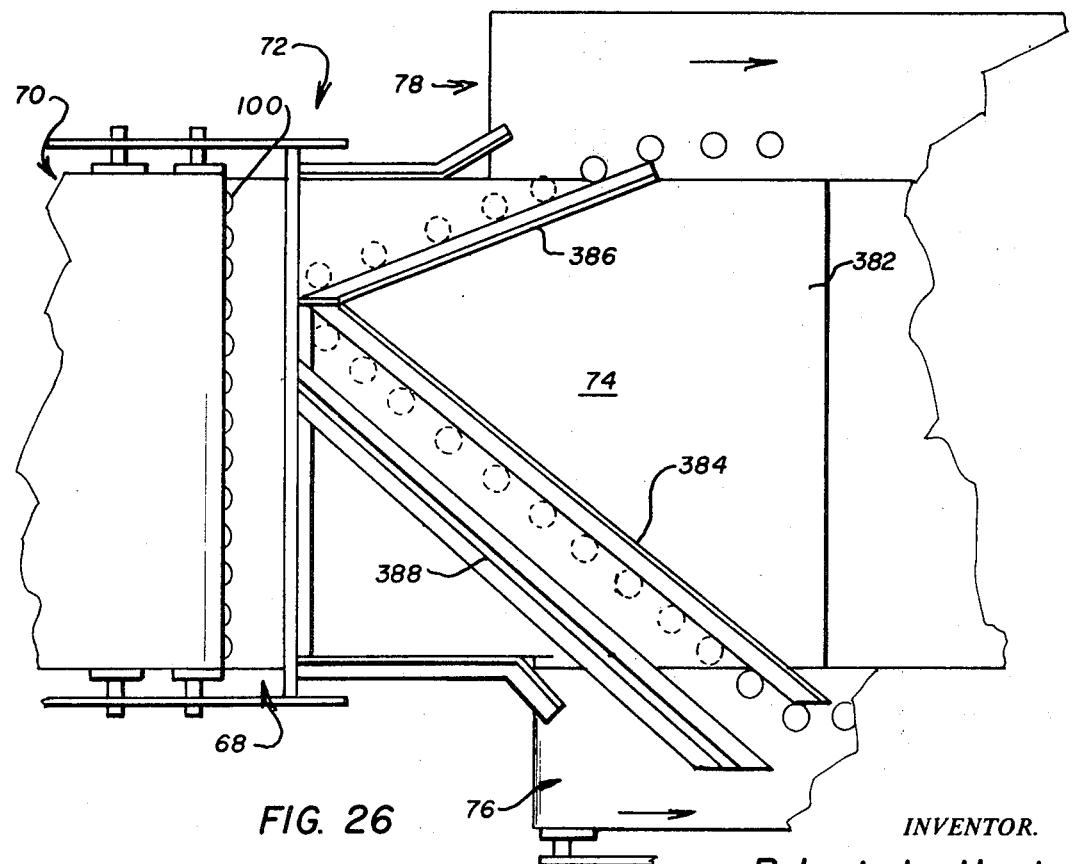
FIG. 26 is a top plan view of the diverter.

Referring now to FIGS. 1, 25 and 26, the apparatus for realigning the lids into single file again for delivery to the assembly stations will now be described. Conveyor 68 carries the transverse rows of lids forward into transfer zone 72 where they are intercepted by diverter 74. The diverter includes a large rectangular plate 382 which overlies the major portion of the area of conveyor 68 and is spaced closely above the conveyor to provide just sufficient clearance for free passage of the lids.

A diverter rib 384 divides plate 382 and extends above and below it to provide stiffness, the lower margin of rib lying substantially in contact with the surface of conveyor belt 68 to intercept the lids carried thereby. As will be seen in FIG. 26, the rib extends at an angle to the direction of travel of belt 68, with its downstream end overlying an eighth conveyor 76. As the rows reach the rib at relatively high speed they are angularly diverted and the rubbing action of the low friction belt provides just enough drive to cause them to proceed in single file along the length of the rib and onto conveyor 76, which then delivers them sequentially in single file to the first assembly zone 80, where they are arranged in sets of suitable quantities and placed in boxes. The boxes are then conveyed to a first packaging zone where they are packed in cartons for shipping.

If all of the lids are to be packed separately from closure bands, the upstream end of rib 384 will be located at one side of the conveyor and the rib will extend diagonally across the entire width. However, the apparatus is usually operated to provide a certain quantity of lids for combining with flanges closure bands to constitute complete closure assemblies which are sold in sets with new jars, and to provide a much larger quantity of lids to be packed in separate sets and sold for replacement use by housewives.

For this purpose, rib 384 is arranged as shown in FIG. 26 with its upstream end located between the sides of the conveyor, and a second rib 386 is provided which diverts a smaller portion of the lids into single file and deposits them on ninth conveyor 78 which delivers the lids sequentially in single file to the second assembly zone 84.

Another variation includes the provision of a third diverter rib 388 to divide the larger group of lids into two single file rows for delivery to conveyor 76.

LID AND CLOSURE BAND ASSEMBLY

Figure 27:
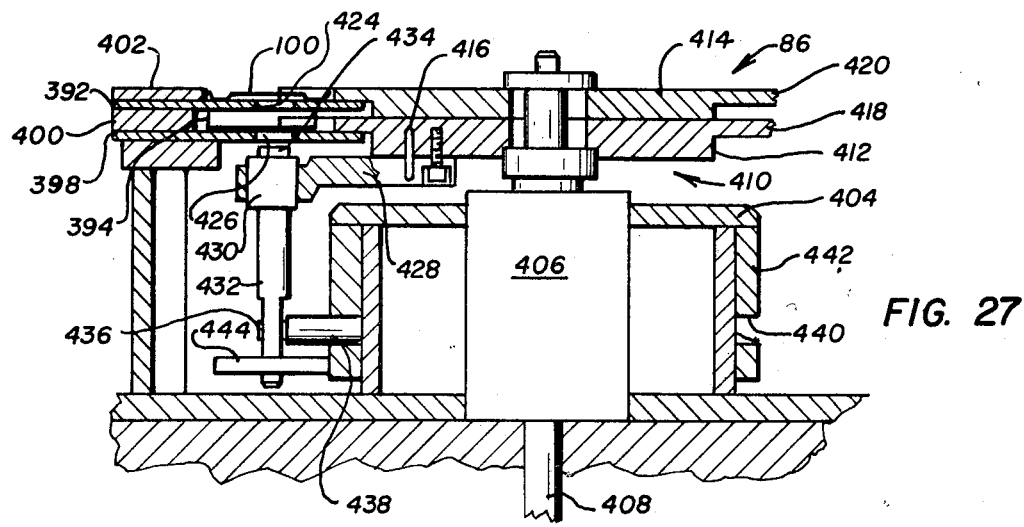
FIG. 27 is a sectional view in elevation of the assembly machine.
Figure 28:
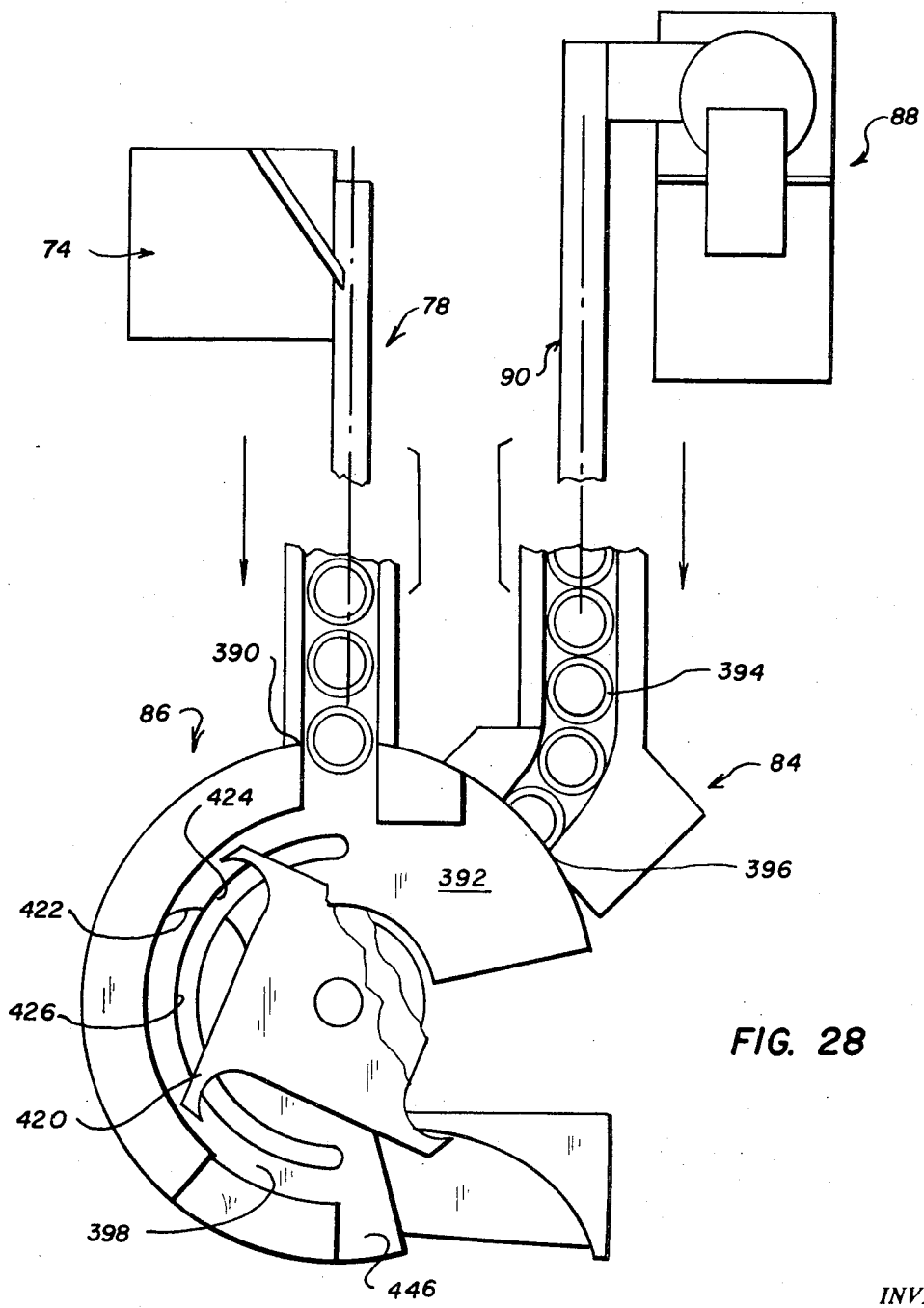
FIG. 28 is a top plan view of the assembly machine.

Referring now to FIGS. 1, 27, and 28, the machine for combining lids with flanged closure bands to produce total closure assemblies will now be described. The assembly machine 86 is located at the second assembly zone 84 and is supplied sequentially with lids in single file by conveyor 78. It is fed with flanged closure bands from a source of supply 88 by a tenth conveyor 90. The source 88 may be a complete stamping and forming machine or a storage bin with means for sorting the bands and supplying them to conveyor 90. The conveyor supplies the bands sequentially in single file to machine 84 with their flanged edges up. As is well known, these bands include a narrow annular planar marginal band to engage the margin of a lid in use and a generally cylindrical flange threaded to engage the thread on the jar mouth and clamp the lid in sealing engagement.

The lids enter the machine at 390 and move onto an arcuate plate 392 while the bands 394 enter the machine at 396 and move onto an arcuate plate 398 spaced below plate 392 sufficiently to allow free movement of the bands. An arcuate spacer and guide plate 400 maintains the proper spacing between plates 392 and 398 and also defines the outer side of the path of travel of the bands 394 through the machine. An arcuate guide plate 402 defines the outer side of the path of travel of the lids 100 through the machine.

As best seen in FIG. 27, a cylindrical base member 404 contains a bearing 406 for vertical drive shaft 408. At the top of the shaft is fixed a dual feeding rotor 410, preferably in the form of two star wheels 412 and 414 keyed in registry pin 416. The arms 418 of star wheel 412 and 420 of star wheel 414 are in vertical registry and when the rotor revolves counter clockwise as viewed in FIG. 28 they sequentially pick up and move a set of one lid and one band through their arcuate paths with the lid above and in registry with its respective band. The upper arcuate plate 392 terminates at 422 considerably short of the extent of arcuate plate 398, and the lid is free to descend into seating engagement in the band. However, if the lid drops by gravity it has a tendency to tilt, and a part of its margin may catch on the thread of the band flange so that it does not seat properly. MOreover, the lids are made to fit rather snugly in the bands and usually need some force to push them into place.

To avoid any possible difficulty, means are provided to move the lid positively into its seating position. An arcuate slot 424 is formed in plate 392 and an arcuate slot 426 is formed in plate 398. These slots are in vertical alignment with each other and with the paths of the centers of the lid and band. A bracket 428 is bolted to the underside of plate 412 angularly in advance of each arm 418, and at its outer end carries a bearing 430 which is centered directly under the center of a band engaged with the respective star wheel arm.

A vertical shaft 432 is mounted in each bearing for vertical movement and carries at its upper end a magnet 434. Slots 424 and 426 are of sufficient width to freely pass the magnet and shaft. A radial arm 436 is attached to the lower end of each shaft 432 and extends radially inwardly, carrying a roller cam follower 438 to follow in cam track 440 formed in the side wall 442 of base member 404. A roller guide 444 is mounted at the bottom of shaft 432 to contact the wall of base member 404 and steady the shaft.

Cam track 440 is formed so that as each star wheel arm approaches the beginning of slots 424 and 426 the shaft 432 will begin to rise and magnet 434 will ascend through both slots and contact the center of the lid. The magnet stays at the upper level with its field retaining the lid until the lid has moved arcuately beyond the end 422 of its supporting plate. The magnet then gradually descends, carrying the lid with it and pulling the lid firmly into seating engagement in the band, after which the magnet descends below plate 398 and releases the lid. The assembly now continues onward riding on plate 398 until it reaches the exit 446 where it passes onto the receiving end of eleventh conveyor 92 to be delivered to the second packaging zone 94.

It will be understood that the closures arriving at zones 80 and 94 may be packaged automatically or manually. It is also to be understood that if one-piece closures are to be manufactured, having an annular sealing area at the margin of the lid portion, they may be stamped and formed by machine 30 suitably modified for the purpose, and such closures may be processed through the apparatus in the same manner described above with respect to the lids.

It will be apparent to those skilled in the art that various changes may be made in the construction and operation of the system disclosed without departing from the spirit of the invention, and it is intended that all such changes shall be embraced within the scope of the following claims.

What is claimed is:

1. Apparatus for automatically transferring articles of paramagnetic material from a first conveyor to a second conveyor without surface damage, comprising: a first conveyor for carrying said articles; magnetic field creating means disposed in spaced relation above a portion of said first conveyor; a second conveyor having a portion disposed intermediate the magnetic field creating means and the first conveyor, said second conveyor including a second magnetic field creating means in the form of a magnetized pulley for guiding one end loop of the second conveyor through an arc of approximately 180 degrees in a vertical plane, said pulley being disposed adjacent an end of said first magnetic field creating means and cooperating therewith to produce a substantially continuous magnetic field, and said pulley serving to retain said articles in contact with the second conveyor during travel through said arc to invert the attitude of each article; and means for operating both of said conveyors so that said articles carried by the first conveyor will pass into the magnetic field and be forced by said field into contact with the overlying portion of said second conveyor and be retained thereagainst, and will be carried out of said magnetic field by said second conveyor.

2. Apparatus for conveying, transferring, and inverting articles having first and second faces, comprising: a first conveyor provided with an endless loop belt adapted to sequentially convey said articles, first face down, on its upper pass from a source of supply to a transfer zone; a second conveyor provided with an endless loop belt overlying the first conveyor at the transfer zone and extending in a direction generally perpendicular to the longitudinal axis of the first conveyor to deliver said articles from the transfer zone to another zone; the lower pass of the second conveyor overlying the upper pass of the first conveyor in spaced relation; an elongate magnet overlying the lower pass of the second conveyor and the upper pass of the first conveyor and extending parallel to the longitudinal axis of the second conveyor; a magnetized pulley located laterally adjacent to the first conveyor and rotatable about a horizontal axis to guide the belt of the second conveyor from its lower pass in an arc to its upper pass, the first conveyor serving to sequentially deliver said articles under the lower pass of the second conveyor; said elongate magnet serving to attract said articles toward the lower pass of the second conveyor belt and retain them with their second faces in contact therewith; and said magnetized pulley serving to retain said articles in contact with said belt thereafter during its arcuate travel to invert said articles to a first face up attitude.

3. Apparatus as claimed in claim 2; said first conveyor being provided with a second belt; said first and second belts being adapted to deliver laterally adjacent pairs of articles to said second conveyor simultaneously; said elongate magnet serving to pick said articles up two at a time and retain them against the second conveyor belt to arrange them in single file.

4. Apparatus as claimed in claim 3; and a source of supply adapted to deliver said articles sequentially to both of said first conveyor belts at selected time intervals; said belts being driven at sufficient speed to produce substantial gaps between successive articles to enable the second conveyor belt to remove each pair of articles from the transfer point before the arrival of the succeeding pair.

5. Apparatus as claimed in claim 4; said source of supply being adapted to deliver said articles to each of the first conveyor belts alternately, resulting in a staggered relation; and means to drive said belts differentially to cause each related pair of articles to arrive at the transfer zone simultaneously.

6. Apparatus for conveying, transferring, and inverting articles having first and second faces, comprising: a first conveyor provided with an endless loop belt adapted to sequentially convey said articles, first face down, on its upper pass from a source of supply to a transfer zone; a second conveyor provided with an endless loop belt overlying the first conveyor at the transfer zone to deliver said articles from the transfer zone to another zone; the lower pass of the second conveyor overlying the upper pass of the first conveyor in spaced relation; an elongate magnet overlying the lower pass of the second conveyor and the upper pass of the first conveyor and extending parallel to the longitudinal axis of the second conveyor; a magnetized pulley located immediately adjacent said elongate magnet and rotatably mounted to guide the belt of the second conveyor from its lower pass in an arc to its upper pass; the first conveyor serving to deliver sequentially said articles under the lower pass of the second conveyor; said elongate magnet serving to attract said articles toward the lower pass of the second conveyor belt and retain them with their second faces in contact therewith; and said magnetized pulley serving to retain said articles in contact with said belt thereafter during its arcuate travel to invert said articles to a first face up attitude.

7. An apparatus for moving articles of paramagnetic material from a first predetermined conveying means to a second predetermined conveying means, said apparatus comprising: means for supporting articles on said first predetermined conveying means; transfer conveying means having a receiving end adjacent to said first conveying means and a discharge end adjacent to said second conveying means; first magnetic force means adjacent to said transfer conveying means to sequentially cause articles at said first conveying means to terminate contact with said first conveying means and thereafter brought into contact with said transfer conveying means and retain them in said contact so that said transfer conveying means carries said articles to said second conveying means; second magnetic force means for maintaining said articles in contact with one of said conveying means; and means acting upon said articles in a direction other than the conveying direction to release said articles from said transfer conveying means at the discharge end thereof so that said articles are deposited at said second conveying means.

* * * * *

UNITED STATES PATENT OFFICE
CERTIFICATE OF CORRECTION

Patent No. 3,712,453            Dated January 23, 1973

Inventor(s) Robert L. Hurst

It is certified that error appears in the above-identified patent and that said Letters Patent are hereby corrected as shown below:

Column 10, line 48, "Continues" should read -- Continued --.

Column 11, line 31, "17 and 20" should read -- 17 to 20 --.

Column 12, line 60, after "312 is" the word -- negatived" should be inserted.

Column 16, line 23, after "438" the word -- adapted -- should be inserted.

Signed and Sealed this

Twenty-sixth Day of April 1977

[SEAL]

Attest:

RUTH C. MASON
*Attesting Officer*

C. MARSHALL DANN
*Commissioner of Patents and Trademarks*